United States Patent
Miyashita et al.

(10) Patent No.: US 9,899,702 B2
(45) Date of Patent: Feb. 20, 2018

(54) SULFIDE-BASED SOLID ELECTROLYTE FOR LITHIUM ION CELL, AND SOLID ELECTROLYTE COMPOUND

(71) Applicant: Mitsui Mining & Smelting Co., Ltd., Tokyo (JP)

(72) Inventors: Norihiko Miyashita, Ageo (JP); Takashi Chikumoto, Ageo (JP); Tatsuya Aoki, Ageo (JP); Hitohiko Ide, Ageo (JP); Kenji Matsuzaki, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 15/538,667

(22) PCT Filed: Dec. 25, 2015

(86) PCT No.: PCT/JP2015/086228
§ 371 (c)(1),
(2) Date: Jun. 22, 2017

(87) PCT Pub. No.: WO2016/104702
PCT Pub. Date: Jun. 30, 2016

(65) Prior Publication Data
US 2017/0352916 A1  Dec. 7, 2017

(30) Foreign Application Priority Data
Dec. 26, 2014 (JP) .................... 2014-265950

(51) Int. Cl.
*H01M 10/0562* (2010.01)
*C01B 25/14* (2006.01)
(Continued)

(52) U.S. Cl.
CPC ........ *H01M 10/0562* (2013.01); *C01B 25/14* (2013.01); *H01M 4/386* (2013.01); (Continued)

(58) Field of Classification Search
None
See application file for complete search history.

(56) References Cited

U.S. PATENT DOCUMENTS 6,277,524 B1  8/2001  Kanno
8,075,865 B2  12/2011  Deiseroth et al.
(Continued)

FOREIGN PATENT DOCUMENTS

JP  3184517 B2  4/2001
JP  2001250580 A  9/2001
(Continued)

OTHER PUBLICATIONS

Stadler, F. et al., "Crystalline halide substitute Li-argyrodites as solid electrolyte for lithium ion batteries", The Electrochemical Society, Oct. 6, 2009.

*Primary Examiner* — Jonathan Crepeau
(74) *Attorney, Agent, or Firm* — The Webb Law Firm (57) ABSTRACT

Relating to a sulfide-based solid electrolyte compound for lithium ion batteries which has a cubic argyrodite-type crystal structure, to provide a compound which can suppress a generation amount of hydrogen sulfide when being left to stand in the air and which can maintain high conductivity even when being left to stand in dry air. Proposed is a sulfide-based solid electrolyte compound for lithium ion batteries containing a crystal phase of the cubic argyrodite-type crystal structure and represented by a composition formula (1): $Li_{7-x+y}PS_{6-x}Cl_{x+y}$, wherein x and y in the composition formula (1) satisfy $0.05 \leq y \leq 0.9$ and $-3.0x+1.8 \leq y \leq -3.0x+5.7$.

18 Claims, 3 Drawing Sheets

(51) Int. Cl.
*H01M 10/0525* (2010.01)
*H01M 4/38* (2006.01)
*H01M 4/62* (2006.01)
*H01M 4/505* (2010.01)
*H01M 4/525* (2010.01)

(52) U.S. Cl.
CPC ........... *H01M 4/505* (2013.01); *H01M 4/525* (2013.01); *H01M 4/625* (2013.01); *H01M 10/0525* (2013.01); *H01M 2300/0068* (2013.01)

(56) References Cited

U.S. PATENT DOCUMENTS

| | | |
|---|---|---|
| 2011/0081580 A1 | 4/2011 | Stadler et al. |
| 2013/0177821 A1 | 7/2013 | Tsuchida et al. |
| 2014/0141341 A1 | 5/2014 | Ohtomo et al. |
| 2014/0302382 A1 | 10/2014 | Kambara et al. |
| 2015/0357674 A1 | 12/2015 | Haga et al. |
| 2015/0357675 A1 | 12/2015 | Ohtomo et al. |

FOREIGN PATENT DOCUMENTS

| | | |
|---|---|---|
| JP | 3744665 B2 | 12/2005 |
| JP | 2010540396 A | 12/2010 |
| JP | 201196630 A | 5/2011 |
| JP | 201248971 A | 3/2012 |
| JP | 2013137889 A | 7/2013 |
| JP | 2013201110 A | 10/2013 |
| JP | 2014137868 A | 7/2014 |
| KR | 201425542 A | 3/2014 |

SULFIDE-BASED SOLID ELECTROLYTE FOR LITHIUM ION CELL, AND SOLID ELECTROLYTE COMPOUND

CROSS-REFERENCE TO RELATED APPLICATIONS

This application is the United States national phase of International Application No. PCT/JP2015/086228 filed Dec. 25, 2015, and claims priority to Japanese Patent Application No. 2014-265950 filed Dec. 26, 2014, the disclosures of which are hereby incorporated in their entirety by reference.

TECHNICAL FIELD

The present invention relates to a sulfide-based solid electrolyte compound for a lithium ion battery, which can be suitably used as a solid electrolyte for a lithium ion battery and the solid electrolyte.

BACKGROUND ART

A lithium ion battery is a secondary battery having a structure in which lithium dissolves out as ions from a positive electrode at the time of charging and moves to a negative electrode to be stored therein, and conversely, the lithium ions return to the positive electrode from the negative electrode at the time of discharging. Since the lithium ion battery has features such as high energy density and a long life cycle, it is widely used as a power supply for electric appliances such as a video camera, portable electronic devices such as a laptop computer and a mobile telephone, electric tools such as a power tool, and the like. Recently, the lithium ion battery is also applied to a large-sized battery that is mounted in an electric vehicle (EV), a hybrid electric vehicle (HEV), and the like.

This kind of a lithium ion battery is constituted of a positive electrode, a negative electrode, and an ion conducting layer inserted between both of the electrodes. As the ion conducting layer, a separator constituted of a porous film, such as polyethylene and polypropylene, which is filled with a non-aqueous electrolytic solution, is generally used. However, since such an organic electrolytic solution using a flammable organic solvent as a solvent is used as an electrolyte, it is required to improve a structure and material for preventing volatilization or leakage, and also, it is required to install a safety device for suppressing an increase in temperature at the time of a short circuit and to improve the structure and material for preventing a short circuit.

In contrast, an all-solid lithium secondary battery that is constituted by solidifying the whole battery using a solid electrolyte does not use a flammable organic solvent, and thus, it is possible to attempt the simplification of a safety device, and also, the battery can be made excellent in the production cost or productivity. In addition, it is possible to attempt high voltage by laminating the solid electrolyte in a cell in series. Furthermore, for this kind of a solid electrolyte, since elements do not move except Li ions, there are no side reactions by the movement of anion, and thus, it is expected that it leads to improve safety or durability.

Such a solid electrolyte that is used for a battery is required to have high ionic conductivity, and to be chemically or electrochemically stable. For example, lithium halide, lithium nitride, lithium oxyacid salt, or derivatives thereof are known as a candidate of the raw material.

With regard to this kind of a solid electrolyte, for example, Patent Document 1 discloses a sulfide-based solid electrolyte, in which a high temperature lithium ion conductive compound composed of lithium phosphate ($Li_3PO_4$) allows to be in lithium ion conductive sulfide glass represented by a general formula, $Li_2S$—X (wherein X represents at least one sulfide of $SiS_2$, $GeS_2$, and $B_2S_3$).

In addition, Patent Document 2 discloses a sulfide-based solid electrolyte comprising a lithium ion conductive material that is a composite compound represented by a general formula, $Li_2S$—$GeS_2$—X (wherein X represents at least one of $Ga_2S_3$ and ZnS) as a material that is crystalline and exhibits very high ionic conductivity, that is, $6.49 \times 10^{-5}$ $Scm^{-1}$ of the ionic conductivity at room temperature.

Patent Document 3 discloses a lithium ion conductive sulfide ceramic, which is a sulfide ceramic having high lithium ionic conductivity and decomposition voltage, comprising $Li_2S$ and $P_2S_5$ as a main component, and having compositions of $Li_2S$=82.5 to 92.5 and $P_2S_5$=7.5 to 17.5 in mol %, and among them, preferably a composition of $Li_2S/P_2S_5$=7 (composition formula: $Li_7PS_6$) in molar ratio.

Patent Document 4 discloses a lithium ion conductive material that is represented by a chemical formula: $Li^+_{(12-n-x)}B^{n+}X^{2-}_{(6-x)}Y^-_x$ (wherein $B^{n+}$ represents at least one selected from P, As, Ge, Ga, Sb, Si, Sn, Al, In, Ti, V, Nb, and Ta, $X^{2-}$ represents at least one selected from S, Se, and Te, $Y^-$ represents at least one selected from F, Cl, Br, I, CN, OCN, SCN, and $N_3$, and $0 \leq x \leq 2$), and has an argyrodite-type crystal structure.

Patent Document 5 discloses a lithium argyrodite, which is a solid compound capable of being prepared as a single layer in addition to high fluidity of the lithium ion, and is represented by a general formula (I) $Li^+_{(12-n-x)}B^{n+}X^{2-}_{(6-x)}Y^-_x$, wherein, in the formula, $B^{n+}$ is selected from the group consisting of P, As, Ge, Ga, Sb, Si, Sn, Al, In, Ti, V, Nb, and Ta, $X^{2-}$ is selected from the group consisting of S, Se, and Te, $Y^-$ is selected from the group consisting of Cl, Br, I, F, CN, OCN, SCN, and $N_3$, and $0 \leq x \leq 2$.

Patent Document 6 discloses a sulfide-based solid electrolyte, which is a new sulfide-based solid electrolyte capable of significantly enhancing conductivity compared with conventional solid electrolytes, having a framework structure of $Li_7PS_6$, and comprising a composition formula: $Li_{7+x}P_{1-y}Si_yS_6$ (wherein x is in a range of −0.6 to 0.6 and y is in a range of 0.1 to 0.6) in which a part of P is substituted by Si.

CITATION LIST

Patent Document

Patent Document 1: Japanese Patent No. 3184517
Patent Document 2: Japanese Patent No. 3744665
Patent Document 3: Japanese Patent Application Laid-Open (JP-A) No. 2001-250580
Patent Document 4: JP-A No. 2011-96630
Patent Document 5: National Publication of International Patent Application No. 2010-540396
Patent Document 6: JP-A No. 2013-137889

The present inventors focused on a compound having a cubic argyrodite-type crystal structure and being represented by $Li_{7-x}PS_{6-x}Cl_x$, as a solid electrolyte material compound used for a lithium ion battery from the point of view of excellent ionic conductivity or the like.

However, such compound has a problem that since a reactivity with moisture or oxygen is extremely high, when the compound is exposed to the air, the compound is reacted with moisture in the air to generate hydrogen sulfide. Further, such compound has also a problem that, even when the compound is exposed to dry air, the compound is reacted with oxygen in the air to decrease the conductivity.

Thus, the present invention, which relates to a sulfide-based solid electrolyte compound for a lithium ion battery having a cubic argyrodite-type crystal structure, is to propose a novel sulfide-based solid electrolyte compound for a lithium ion battery, which can suppress a generation amount of hydrogen sulfide when being exposed to the air, and can maintain high conductivity even when being left to stand in dry air.

SUMMARY OF THE INVENTION

The present invention proposes a sulfide-based solid electrolyte compound for a lithium ion battery which comprises a crystal phase of a cubic argyrodite-type crystal structure, and is represented by a composition formula (1): $Li_{7-x+y}PS_{6-x}Cl_{x+y}$, wherein x and y in the composition formula (1) satisfy $0.05 \leq y \leq 0.9$ and $-3.0x+1.8 \leq y \leq -3.0x+5.7$.

The sulfide-based solid electrolyte compound proposed by the present invention has excellent oxidation resistance as compared with a sulfide-based solid electrolyte compound represented by a stoichiometric composition of $Li_{7-x}PS_{6-x}Cl_x$, and thus high conductivity can be maintained even after being left to stand in dry air. Further, the sulfide-based solid electrolyte compound proposed by the present invention has excellent water resistance, and is also excellent on the point that a generation amount of hydrogen sulfide which is caused by a reaction with moisture in the air can be effectively suppressed even when being exposed to the air. For example, even when a battery is destroyed and the sulfide-based solid electrolyte compound is then exposed to the air, the generation of hydrogen sulfide can be effectively suppressed, and thus a safe all-solid battery can be provided.

Accordingly, the sulfide-based solid electrolyte compound proposed by the present invention can be suitably used as a solid electrolyte for a lithium ion battery in particular.

DETAILED DESCRIPTION OF THE INVENTION

Hereinafter, embodiments of the present invention will be described in detail. However, the scope of the present invention is not limited to the embodiments described below.

The sulfide-based solid electrolyte according to the present embodiment (referred to as "present solid electrolyte") is a sulfide-based solid electrolyte for a lithium ion battery comprising a crystal phase of a cubic argyrodite-type crystal structure, and comprising a sulfide-based solid electrolyte compound which is represented by a composition formula (1): $Li_{7-x+y}PS_{6-x}Cl_{x+y}$ (referred to as "compound A").

The present solid electrolyte may be composed of a single phase of the crystal phase of the cubic argyrodite-type crystal structure, or may be composed of a mixed phase comprising the crystal phase of the cubic argyrodite-type crystal structure and a crystal phase which is represented by LiCl.

Meanwhile, as the mixed phase comprising the crystal phase of the cubic argyrodite-type crystal structure and the crystal phase which is represented by LiCl, a crystal phase other than these may be also comprised, in addition to the crystal phase of the cubic argyrodite-type crystal structure and the crystal phase which is represented by LiCl.

Figure 1:
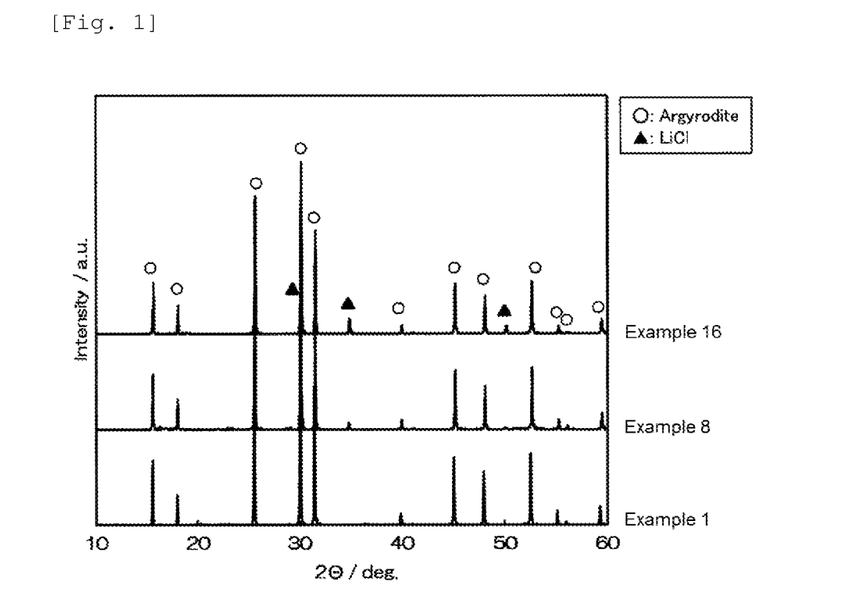
FIG. 1 is a drawing which illustrates XRD patterns of the samples obtained in Examples 1, 8 and 16.
Figure 2:
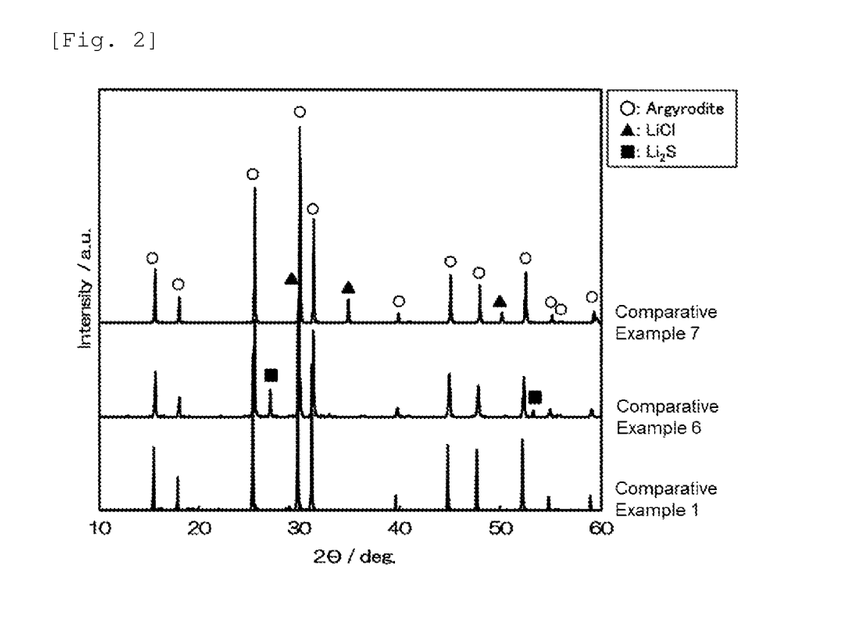
FIG. 2 is a drawing which illustrates XRD patterns of the samples obtained in Comparative Examples 1, 6 and 7.
Figure 3:
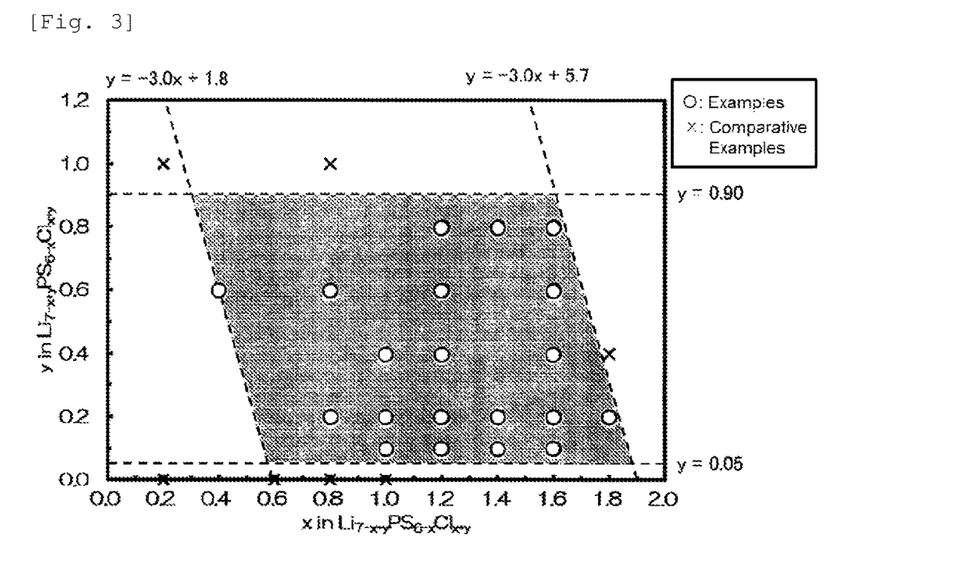
FIG. 3 is a drawing which illustrates composition ranges of Examples and Comparative Examples.

As illustrated in FIG. 3, it is preferable that x and y in the composition formula (1) satisfy the following conditions of (a) and (b) from the point of view of maintaining the conductivity after being left to stand in dry air and suppressing the generation of hydrogen sulfide.

$$0.05 \leq y \leq 0.9 \tag{a}$$

$$-3.0x+1.8 \leq y \leq -3.0x+5.7 \tag{b}$$

Among others, as for the condition (a), it is more preferable to be $0.05 \leq y \leq 0.6$, and even more preferably $0.05 \leq y \leq 0.4$.

In addition, as for the condition (b), it is more preferable to be $-3.0x+2.7 \leq y \leq -3.0x+5.7$, and even more preferably $-3.0x+3.3 \leq y \leq -3.0x+5.7$.

Furthermore, when the present solid electrolyte comprises the crystal phase of the cubic argyrodite-type crystal structure and the crystal phase which is represented by LiCl, it is preferable to further satisfy the following conditions of (g) and (h), in addition to the conditions of (a) and (b).

$$0.05 \leq y \leq 0.4 \tag{g}$$

$$-3.0x+3.9 \leq y \leq -3.0x+5.7 \tag{h}$$

Among others, as for the condition (g), it is more preferable to be $0.05 \leq y \leq 0.2$, and even more preferably $0.1 \leq y \leq 0.2$.

In addition, as for the condition (h), it is more preferable to be $-3.0x+4.2 \leq y \leq -3.0x+5.7$, and even more preferably $-3.0x+4.2 \leq y \leq -3.0x+5.1$.

Further, when the present solid electrolyte comprises the crystal phase of the cubic argyrodite-type crystal structure and the crystal phase which is represented by LiCl, in an X-ray diffraction pattern (ray source: Cu) of the compound A, it is preferable that a ratio $[I_L(200)/I_A(220)]$ of a peak intensity $I_L(200)$ of a (200) plane of a LiCl crystal phase, which is detected at near $2\theta=34.8$ to $35.0°$, more particularly $2\theta=34.8$ to $34.9°$, with respect to a peak intensity $I_A(220)$ of a (220) plane of the cubic argyrodite-type crystal phase, which is detected at near $2\theta=25.3$ to $25.9°$, more particularly $2\theta=25.4$ to $25.8°$, is 0.30 or less.

At this time, the ratio $[I_L(200)/I_A(220)]$ of 0.30 or less means that the conductivity after being left to stand in dry air can be highly maintained and the generation of hydrogen sulfide can be suppressed. In this case, it is furthermore preferable to contain an appropriate amount of LiCl.

From such points of view, the ratio $[I_L(200)/I_A(220)]$ is preferably 0.30 or less, among others, more preferably 0.20 or less, even more preferably 0.01 or more or 0.10 or less, and among others, particularly preferably 0.05 or more.

Since the present solid electrolyte may contain the compound A, it may contain other materials or components. Examples of the other materials may include other solid electrolyte materials, $Li_2S$, $Li_3PS_4$, $Li_4P_2S_6$, LiPSCl, and LiCl. However, the other materials are not limited to these.

However, the compound A is preferably a main material of the present solid electrolyte. It is then preferable that the compound A occupies 50% by mass or more of the whole present solid electrolyte, more preferably 80% by mass, and even more preferably 90% by mass (including 100% by mass). Among others, it is particularly preferable that the present solid electrolyte is constituted only of the compound A.

Further, the present solid electrolyte may contain unavoidable impurities, except the other materials as described above to the extent that the effect of the present invention is less negatively affected, that is, less than 5% by mass, among others, less than 3% by mass.

Moisture Resistance

With regard to the present solid electrolyte, the conductivity after exposure to dry air can be enhanced to $1\times10^{-3}$ $S \cdot cm^{-1}$ or more, and further to $2\times10^{-3}$ $S \cdot cm^{-1}$ or more.

Incidentally, the phrase "dry air" in the present description means air in which the moisture is eliminated using an air drier or the like such that the moisture concentration is 100 ppm or less (dew point of about −42° C. or less).

(Generation Amount of Hydrogen Sulfide)

As for the present solid electrolyte, the generation amount of hydrogen sulfide ($H_2S$) when the present solid electrolyte is being left to stand in the air can be suppressed to less than 10 $cm^3 \cdot g^{-1}$, and among others, less than 1.0 $cm^3 \cdot g^{-1}$.

Ionic Conductivity

It is known that a sulfide-based solid electrolyte has originally excellent ionic conductivity, easily forms the interface with an active material at room temperature as compared with oxide, and allows the interfacial resistance to decrease. Among others, for the present solid electrolyte, since there are a few of sulfur deficiency and crystallinity is then high, electron conductivity is low and lithium ionic conductivity is particularly excellent.

Producing Method

Next, an example of the method for producing the compound A or the present solid electrolyte will be described. However, the producing method as described here is merely an example, and the invention is not limited to this method.

The compound A or the present solid electrolyte can be obtained by mixing, for example, a lithium sulfide ($Li_2S$) powder, a diphosphorus pentasulfide ($P_2S_5$) powder, and a lithium chloride (LiCl) powder, and by calcining the resultant mixture.

As for a ratio of the lithium sulfide ($Li_2S$) powder, the diphosphorus pentasulfide ($P_2S_5$) powder, and the lithium chloride (LiCl) powder, it is preferable to mix 38.8 to 72.0 parts (mol %) of lithium sulfide ($Li_2S$) powder, 10.2 to 12.4 parts (mol %) of diphosphorus pentasulfide ($P_2S_5$) powder, and 15.6 to 51.0 parts (mol %) of lithium chloride (LiCl) powder.

In addition, as a mixing method of the raw materials, it is preferable to pulverize and mix the raw materials by, for example, a ball mill, a beads mill, a homogenizer, and the like.

At this time, for the pulverizing and mixing, when the crystallinity of raw material powders is reduced or subjected to an amorphizing process, or the mixed powder of raw materials is homogenized by a very strong mechanical pulverizing and mixing such as a mechanical alloying method, a binding between cation and sulfur is broken to generate sulfur deficiency at the time of calcining, thereby exhibiting electron conductivity. For this reason, the pulverizing and mixing in the level capable of maintaining the crystallinity of raw material powders is preferable.

After performing the mixing as described above, if necessary, drying is performed, and then, calcining is performed under an inert atmosphere or under circulating a hydrogen sulfide gas ($H_2S$). Thereafter, the compound A or the present solid electrolyte can be obtained by crushing or pulverizing if necessary, and by classifying if necessary.

Meanwhile, when the temperature is increased, sulfur deficiency is easily occurred in a sulfide material. Therefore, the sulfide material is conventionally calcined by enclosing with a quartz tube, or the like. However, in this case, there is difficulty in industrial production. Further, since the enclosed quartz tube is sealed, there is a risk that the gas included in the quartz tube is expanded by heating, the pressure in the quartz tube is increased, and then the quartz tube is broken. Therefore, it is necessary to make a vacuum state at the time of enclosing as much as possible. However, in the state of vacuum, sulfur deficiency is easily occurred in the sulfide material.

In contrast, as for the compound A, since the crystallization is accelerated from about 200° C., it is possible to synthesize even if the calcination is performed at a relative low temperature. For this reason, by calcining at 350° C. or more under an inert atmosphere or under circulating a hydrogen sulfide gas ($H_2S$), it is possible to produce the compound A that is a sulfide of the purposed chemical composition in which there is almost no sulfur deficiency.

Among others, when using a hydrogen sulfide gas at the time of calcining, a sulfur partial pressure near the calcined sample can be increased by a sulfur gas generated by decomposing hydrogen sulfide at the time of calcining. Therefore, the sulfur deficiency is hardly occurred even at a high calcining temperature, and the electron conductivity can be decreased. Accordingly, when calcining under an atmosphere including a hydrogen sulfide gas, the calcining temperature is preferably set to 350 to 550° C., and more preferably 450° C. or more or 500° C. or less.

As described above, when calcining under circulating a hydrogen sulfide gas ($H_2S$), the calcination can be performed without losing sulfur in the sulfide by calcining at 350 to 550° C.

Meanwhile, when calcining under an inert atmosphere, unlike the case of the hydrogen sulfide gas, it is not possible to increase the sulfur partial pressure near the calcined sample at the time of calcining. Therefore, in the case of high calcining temperature, it is easy to generate the sulfur deficiency and increase the electron conductivity. For this reason, when calcining under an inert atmosphere, the calcining temperature is preferably set to 350 to 500° C., more preferably 350° C. or more or 450° C. or less, and even more preferably 400° C. or more or 450° C. or less.

Incidentally, since an unreacted phase is generally disappeared by completely reacting raw material powders, it is preferable to calcine at 450° C. or more while circulating a hydrogen sulfide gas. However, in the case of using a raw material powder having small particle size and high reactivity, the reaction is promoted even at a low temperature, and thus the calcining may be performed even under an inert atmosphere.

Further, the raw material is very unstable in the air, and thus, the raw material is decomposed by reacting with water to generate a hydrogen sulfide gas, or to oxidize. Therefore, it is preferable to calcine by setting the raw material in a furnace through a glove box or the like which is substituted with an inert gas atmosphere.

By producing as described above, the generation of the sulfur deficiency can be suppressed, and the electron conductivity can be reduced. For this reason, when an all-solid lithium ion battery is produced using the compound A as a solid electrolyte, the battery characteristics such as charge and discharge characteristic and cycle characteristic can be good.

Application of Present Solid Electrolyte

The present solid electrolyte can be used for a solid electrolyte layer of an all-solid lithium ion battery, a solid electrolyte mixed in a positive or negative electrode mixture, or the like.

For example, an all-solid lithium ion battery can be constituted by forming a positive electrode, a negative electrode, and a layer constituted of the solid electrolyte between the positive electrode and the negative electrode.

In so doing, the present solid electrolyte has excellent water resistance and oxidation resistance, and thus the characteristic degradation is low even by handling in dry air. Therefore, assembling work of the all-solid lithium ion battery can be performed even at, for example, a dry room or the like.

Here, the layer constituted of the solid electrolyte can be produced, for example, by a method in which a slurry composed of a solid electrolyte, a binder, and a solvent is dropped on a substrate, and rubbed and cut with a doctor blade and the like, a method for cutting with an air knife after contacting the slurry, and a method in which a coating film is formed by a screen printing method or the like, and thus the solvent is removed via heating and drying processes. Alternatively, the layer can be produced in such a manner that powders of the solid electrolyte are pressed by a press and the like to produce pressed powders, and then, the pressed powders are appropriately processed.

As a positive electrode material, a positive electrode material that is being used as a positive electrode active material for a lithium ion battery can be appropriately used. Examples of the positive electrode active material may include a spinel-type lithium transition metal oxide, a lithium transition metal oxide having a layer structure, olivine, and a mixture of two or more kinds of these.

As for a negative electrode material, a negative electrode material that is being used as a negative electrode active material for a lithium ion battery can be appropriately used.

For example, the present solid electrolyte is electrochemically stable, and thus, carbon-based materials such as artificial graphite, natural graphite, and non-graphitizing carbon (hard carbon), which may be charged and discharged at a lower electric potential (about 0.1 V vs $Li^+/Li$) that is equal to a lithium metal, can be used as a negative electrode active material for a lithium ion battery. For this reason, by using the present solid electrolyte as an electrolyte for a lithium ion battery, and using a carbon-based material as a negative electrode active material, energy density of an all-solid lithium ion battery can be greatly improved. Therefore, a lithium ion battery having, for example, the present solid electrode and a negative electrode active material including carbon such as artificial graphite, natural graphite, and non-graphitizing carbon (hard carbon) can be constituted.

In addition, a silicon active material promising as a high capacity negative electrode material can be used as a negative electrode active material for a lithium ion battery. In a lithium ion battery using a general electrolytic solution, it is confirmed that degradation tends to progress from a particle surface of the silicon active material by repeating charge and discharge. Since oxidation of the silicon, in which oxygen of the electrolytic solution component is incorporated, is progressed at the degraded part, attempts are made to substitute fluorine for a part of carbonate contained in the electrolytic solution, or to add several % of vinylene carbonate (VC) or the like for the purpose of forming a coat on a surface of the active material to avoid a contact with the electrolytic solution. By using the present solid electrode as an electrode for a lithium ion battery, and using the silicon active material as a negative electrode active material, an electrolytic solution which is an oxygen source is not contained, oxygen resistant reactivity or moisture resistant reactivity of the solid electrode itself is improved, and thus there is a merit, that is, an amount of oxygen as impurities in which the solid electrode incorporates in the battery is low. Therefore, durability such as storage characteristics can be further improved. Accordingly, a lithium ion battery having, for example, the present solid electrode and the silicon-based negative electrode active material can be constituted.

<Application Method of Lithium Ion Battery Using the Present Solid Electrolyte>

With regard to an application method of a lithium ion battery using present solid electrolyte, for example, a lithium ion battery comprising the present solid electrolyte, a negative electrode active material containing silicon (also referred to as "silicon negative electrode active material"), and a positive electrode active material containing a lithium composite oxide, in charge and discharge cycles, it is preferable to set a termination voltage in the first charging to be higher than a termination voltage in the second or later charging.

In the lithium ion battery, when a negative electrode active material contains silicon in the amount of 50% by mass or more, preferably 70% by mass or more, and more preferably 90% by mass or more, the negative electrode active material may contain other materials such as graphite and tin. These other materials may be contained as an alloy of silicon.

It is known that a capacity of a silicon negative electrode active material is large as compared with a graphite negative electrode active material. For example, even when capacity utilization of the silicon negative electrode active material is about 40%, an increase in capacity can be sufficiently attempted as compared with the graphite negative electrode active material. Meanwhile, in a design to charge and discharge a battery using the silicon negative electrode active material in which 100% of the capacity of the silicon negative electrode active material is used, a lifetime of the battery does not last for a long time. Therefore, in a lithium ion battery using the silicon negative electrode active material, the battery is generally designed to be charged and discharged with a capacity which is considerably lower than that of the silicon negative electrode active material. However, in such a case, the battery has a problem that the performance, in which the silicon negative electrode active originally has, cannot be exhibited.

In order to solve such problem, as described above, a termination voltage in the first charging is set to be higher than a termination voltage in the second or later charging and the battery is then charged to enhance activity of the silicon negative electrode active material, and thus the silicon negative electrode active material can be functioned at an equal load rate. As a result, charge-discharge cycle ability (cycle characteristic) of the battery can be enhanced.

In the application method, it is preferable to charge the battery by setting a termination voltage in the first charging to be 0.1 V or more higher than a termination voltage in the second or later charging, among others, more preferably 0.3 V or more, and even more preferably 0.5 V or more. An upper limit value of a difference between the charging termination voltage of the first cycle and the second or later cycle is not critical, but is typically about 2 V.

Meanwhile, the application method of the lithium ion battery can be applied to a lithium ion battery comprising a silicon negative electrode active material. Particularly, by applying to a sulfide-based solid electrolyte which includes a compound having a crystal phase of a cubic argyrodite-type crystal structure, cycle characteristic can be enhanced in the same manner as the case of the present solid electrolyte. In contrast, in a case of a lithium ion battery using an electrolytic solution-based electrolyte, there is a possibility that the electrolytic solution is decomposed when applying a high voltage in the first cycle, and thus it is difficult to apply the application method.

However, in a case of a lithium ion battery comprising a sulfide-based solid electrolyte other than the present solid electrolyte, there is a possibility that the charge-discharge cycle ability decreases when charging and discharging in a high temperature state, under the influence of oxygen associated with the silicon negative electrode active material. In contrast, the present solid electrolyte has excellent characteristics capable of suppressing a reaction with oxygen as compared with the other sulfide-based solid electrolyte. Therefore, when applying the application method to a lithium ion battery using the present solid electrolyte, an especially excellent effect, in which the charge-discharge cycle ability (cycle characteristic) can be maintained even when charging and discharging in a high temperature state, can be obtained.

Description of Terms

The term "solid electrolyte" in the present invention means all the materials, in which an ion in a solid state, for example, $Li^+$ can be moved.

In addition, when the term "X to Y" (X and Y are arbitrary numbers) is described in the present invention, unless particularly stated otherwise, the expression includes the meaning of "X or more and Y or less", as well as the meaning of "preferably more than X" or "preferably less than Y".

Further, when the term "X or more" (X is an arbitrary number) or "Y or less" (Y is an arbitrary number) is described, the expression includes the meaning of "more than X is preferable" or "less than Y is preferable".

Furthermore, the term "lithium ion battery" in the present invention is meant to widely include a secondary battery in which charging and discharging are performed by moving a lithium ion between a positive electrode and a negative electrode.

Examples

Hereinafter, the present invention will be described based on Examples. However, the present invention is not construed to be limited to these Examples.

Examples and Comparative Examples

In order to have raw material compositions (mol %) listed in Table 1, a lithium sulfide ($Li_2S$) powder, a diphosphorus pentasulfide ($P_2S_5$) powder, and a lithium chloride (LiCl) powder were used to weigh respectively so as to obtain the total amount of 5 g, and pulverized and mixed for 15 hours with a ball mill to prepare a mixed powder. The mixed powder was filled in a container made of carbon, and calcined at 500° C. for 4 hours at a temperature rise and fall rate of 200° C./h in a tubular electric furnace while circulating a hydrogen sulfide gas ($H_2S$, purity of 100%) at 1.0 L/min. Thereafter, the sample was pulverized in a mortar, and sieved with a sieve having an aperture of 53 μm to obtain a powdered sample.

At this time, all of the weighing, mixing, setting into the electric furnace, taking out from the electric furnace, pulverizing, and sieving were performed in a glove box substituted with an Ar gas (dew point of −60° C. or less) that was sufficiently dried.

<Measurement of Compositions>

For each of the samples obtained in Examples and Comparative Examples, a composition was measured by ICP emission analysis method, thereby listing a composition formula in the table.

<X-Ray Diffraction>

Each of the powdered samples obtained in Examples and Comparative Examples was analyzed by X-ray diffraction method (XRD, Cu-ray source) to identify a product phase.

Further, from an X-ray diffraction pattern obtained at this time, a ratio $[I_L(200)/I_A(220)]$ of a peak intensity $I_L(200)$ of a (200) plane detected at near 2θ=34.8 to 35.0° with respect to a peak intensity $I_A(220)$ of a (220) plane detected at near 2θ=25.3 to 25.9° was calculated.

<Measurement of Generation Amount of Hydrogen Sulfide ($H_2S$)>

Each of the samples obtained in Examples and Comparative Examples was weighed 50 mg each in a glove box which was substituted with a sufficiently dried Ar gas (dew point of −60° C. or less), and was put in a bag sealed with laminate. Thereafter, a box made of acrylic having a capacity of 1,755 $cm^3$ was put in a constant temperature and humidity chamber that was maintained at room temperature (25° C.) and a humidity of 30% under air atmosphere, and was maintained such that a temperature in the box made of acrylic was to be the same as the environment in the constant temperature and humidity chamber. Then, the sealed bag containing the sample was opened in the constant temperature and humidity chamber, and the sample was placed in the box made of acrylic quickly. As for hydrogen sulfide which was generated just after replacing the sample in the box made of acrylic until 300 seconds elapsed, a concentration of the hydrogen sulfide was measured using a hydrogen sulfide sensor (GX-2009, manufactured by Riken Keiki Co., Ltd.). A generation amount of the hydrogen sulfide was determined by calculating a volume of the hydrogen sulfide from the concentration of the hydrogen sulfide after the lapse of 300 seconds.

<Measurement of Initial Conductivity>

Each of the samples obtained in Examples and Comparative Examples was subjected to a uniaxial pressing molding at a pressure of 200 MPa in a glove box which was substituted with a sufficiently dried Ar gas (dew point of −60° C. or less) to produce a pellet having a diameter of 10 mm and a thickness of 2 to 5 mm. Further, a carbon paste as an electrode was applied on both top and bottom sides of the pellet, and then the pellet was subjected to a heat treatment at 180° C. for 30 minutes, thereby producing a sample for measuring ionic conductivity. The ionic conductivity was measured with an AC impedance method at room temperature (25° C.)

<Measurement of Conductivity after Exposure to Dry Air>

Each of the samples obtained in Examples and Comparative Examples was put into a glove box which was substituted with a dry air having an average dew point of −45° C., and was left to stand for 6 hours. Thereafter, the sample was put into a glove box which was substituted with a sufficiently dried Ar gas (dew point of −60° C. or less) again, thereby measuring ionic conductivity after exposure to dry air in the same manner as the measurement of the initial conductivity.

"x" and "y" in Table 1 represent x and y of a composition formula: $Li_{7-x+y}PS_{6-x}Cl_{x+y}$, respectively.

Further, in the heading of the product phase of Table 1, "A" represents a single phase comprising a $Li_{7-x+y}PS_{6-x}Cl_{x+y}$ phase of a cubic argyrodite-type crystal structure, "A+LiCl" represents a mixed phase of the $Li_{7-x+y}PS_{6-x}Cl_{x+y}$ phase and a LiCl phase, and "A+Li$_2$S" represents a mixed phase of the $Li_{7-x+y}PS_{6-x}Cl_{x+y}$ phase and a Li$_2$S phase.

Figure 4:
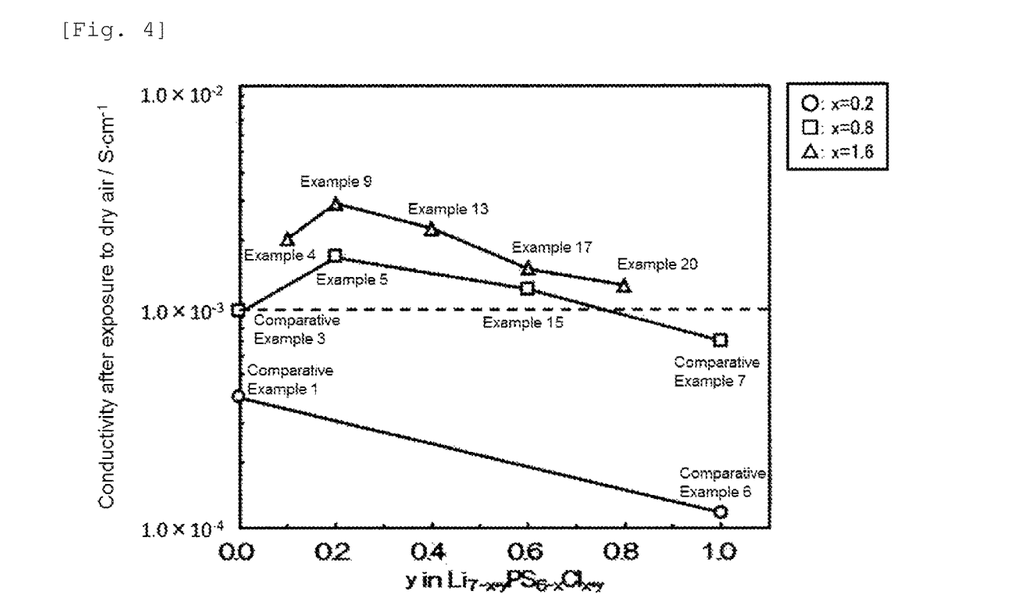
FIG. 4 is a drawing in which values of Examples and Comparative Examples are plotted in the coordinates where the horizontal axis is the added amount of LiCl (y) and the vertical axis is the conductivity after exposure to dry air.

From FIG. 4, in the case of that x was approximately 0.8 or more, it was found that a high conductivity was exhibited when the added amount of LiCl (y) was about 0.2, and further, the conductivity was gradually reduced when the added amount of LiCl (y) was increased. This is because when LiCl is precipitated on the surface of the particles of the compound A by adding LiCl, contact of the sulfide solid electrolyte particles with dry air is suppressed. Therefore, it is considered that a high conductivity can be maintained even after exposure to dry air. However, when the added amount of LiCl is large, a reaction between a small amount of moisture contained in dry air and LiCl is promoted, and then a reaction between LiCl which is reacted with moisture and the compound A is occurred. Therefore, a high conductivity cannot be maintained after exposure to dry air.

Figure 5:
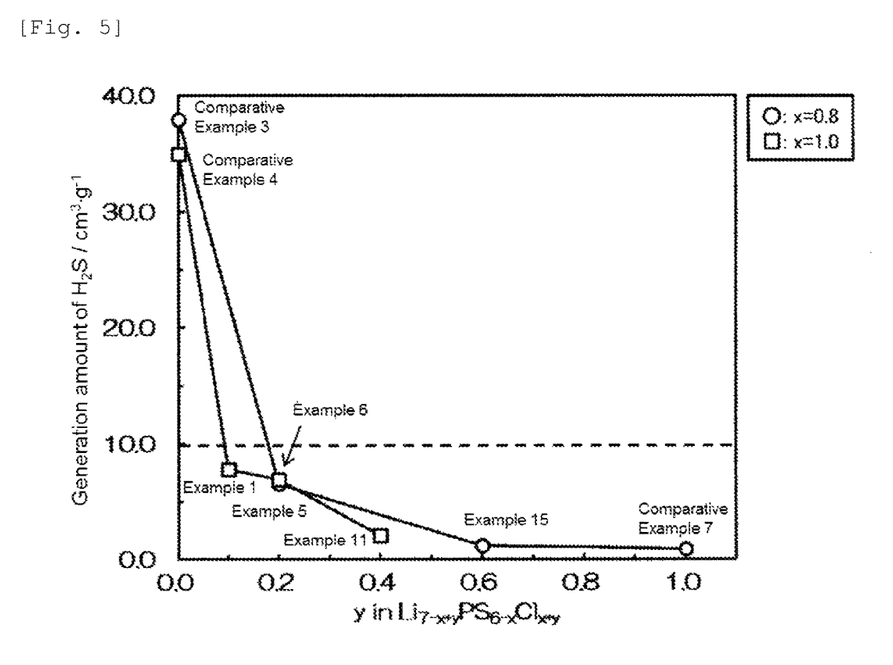
FIG. 5 is a drawing in which the values of Examples and Comparative Examples are plotted in the coordinates where the horizontal axis is the added amount of LiCl (y) and the vertical axis is the generation amount of $H_2S$.

From FIG. 5, it was found that when the added amount of LiCl is increased, the generation amount of H$_2$S is reduced. This is because when LiCl is precipitated on the surface of the particles of the compound A by adding LiCl, contact between the particles of the compound A and dry air is suppressed. Therefore, it can be considered that a reaction with a small amount of moisture contained in dry air is hardly occurred.

TABLE 1

| Examples/Comparative Examples | No. | x | y | Composition ratio of raw materials (mol %) Li$_2$S | P$_2$S$_5$ | LiCl | Composition formula | Product phrase | $I_{L(200)}/I_{A(220)}$ | H$_2$S generation amount [cm$^3$·g$^{-1}$] | Initial conductivity [S·cm$^{-1}$] | Dry air exposure 6 H conductivity [S·cm$^{-1}$] |
|---|---|---|---|---|---|---|---|---|---|---|---|---|
| Examples | 1 | 1.0 | 0.1 | 61.0 | 12.2 | 26.8 | Li$_{6.1}$PS$_{5.0}$Cl$_{1.1}$ | A | 0.00 | 7.8 | 2.02 × 10$^{-3}$ | 1.70 × 10$^{-3}$ |
| | 2 | 1.2 | 0.1 | 56.1 | 12.2 | 31.7 | Li$_{5.9}$PS$_{4.8}$Cl$_{1.3}$ | A | 0.00 | 4.5 | 2.76 × 10$^{-3}$ | 2.40 × 10$^{-3}$ |
| | 3 | 1.4 | 0.1 | 51.2 | 12.2 | 36.6 | Li$_{5.7}$PS$_{4.6}$Cl$_{1.5}$ | A + LiCl | 0.01 | 0.5 | 4.30 × 10$^{-3}$ | 2.78 × 10$^{-3}$ |
| | 4 | 1.6 | 0.1 | 46.3 | 12.2 | 41.5 | Li$_{5.5}$PS$_{4.4}$Cl$_{1.7}$ | A + LiCl | 0.03 | 0.8 | 4.90 × 10$^{-3}$ | 2.03 × 10$^{-3}$ |
| | 5 | 0.8 | 0.2 | 64.3 | 11.9 | 23.8 | Li$_{6.4}$PS$_{5.2}$Cl$_{1.0}$ | A | 0.00 | 6.5 | 1.82 × 10$^{-3}$ | 1.68 × 10$^{-3}$ |
| | 6 | 1.0 | 0.2 | 59.5 | 11.9 | 28.6 | Li$_{6.2}$PS$_{5.0}$Cl$_{1.2}$ | A + LiCl | 0.03 | 6.9 | 2.03 × 10$^{-3}$ | 1.75 × 10$^{-3}$ |
| | 7 | 1.2 | 0.2 | 54.8 | 11.9 | 33.3 | Li$_{6.0}$PS$_{4.8}$Cl$_{1.4}$ | A + LiCl | 0.02 | 0.5 | 2.37 × 10$^{-3}$ | 2.12 × 10$^{-3}$ |
| | 8 | 1.4 | 0.2 | 50.0 | 11.9 | 30.1 | Li$_{5.0}$PS$_{4.6}$Cl$_{1.6}$ | A + LiCl | 0.05 | 0.6 | 4.06 × 10$^{-3}$ | 3.27 × 10$^{-3}$ |
| | 9 | 1.6 | 0.2 | 45.2 | 11.9 | 42.9 | Li$_{5.6}$PS$_{4.4}$Cl$_{1.8}$ | A + LiCl | 0.05 | 0.4 | 4.43 × 10$^{-3}$ | 2.93 × 10$^{-3}$ |
| | 10 | 1.8 | 0.2 | 40.5 | 11.9 | 47.6 | Li$_{5.4}$PS$_{4.2}$Cl$_{2.0}$ | A + LiCl | 0.28 | 0.6 | 2.08 × 10$^{-3}$ | 1.03 × 10$^{-3}$ |
| | 11 | 1.0 | 0.4 | 56.8 | 11.4 | 31.8 | Li$_{6.4}$PS$_{5.0}$Cl$_{1.4}$ | A + LiCl | 0.06 | 2.1 | 1.77 × 10$^{-3}$ | 1.77 × 10$^{-3}$ |
| | 12 | 1.2 | 0.4 | 52.3 | 11.4 | 36.4 | Li$_{6.2}$PS$_{4.8}$Cl$_{1.6}$ | A + LiCl | 0.06 | 1.6 | 3.18 × 10$^{-3}$ | 2.67 × 10$^{-3}$ |
| | 13 | 1.6 | 0.4 | 43.2 | 11.4 | 45.5 | Li$_{6.8}$PS$_{4.4}$Cl$_{2.0}$ | A + LiCl | 0.10 | 1.6 | 4.40 × 10$^{-3}$ | 2.25 × 10$^{-3}$ |
| | 14 | 0.4 | 0.6 | 67.4 | 10.9 | 21.7 | Li$_{7.2}$PS$_{5.0}$Cl$_{1.0}$ | A + Li$_2$S | 0.00 | 0.6 | 1.14 × 10$^{-3}$ | 1.00 × 10$^{-3}$ |
| | 15 | 0.8 | 0.6 | 58.7 | 10.9 | 30.4 | Li$_{6.8}$PS$_{5.2}$Cl$_{1.4}$ | A + LiCl | 0.10 | 1.2 | 1.31 × 10$^{-3}$ | 1.20 × 10$^{-3}$ |
| | 16 | 1.2 | 0.6 | 50.0 | 10.9 | 39.1 | Li$_{6.4}$PS$_{4.8}$Cl$_{1.8}$ | A + LiCl | 0.12 | 1.1 | 2.97 × 10$^{-3}$ | 2.66 × 10$^{-3}$ |
| | 17 | 1.6 | 0.6 | 41.3 | 10.9 | 47.8 | Li$_{6.0}$PS$_{4.4}$Cl$_{2.2}$ | A + LiCl | 0.15 | 0.7 | 2.90 × 10$^{-3}$ | 1.49 × 10$^{-3}$ |
| | 18 | 1.2 | 0.8 | 47.9 | 10.4 | 41.7 | Li$_{6.6}$PS$_{4.8}$Cl$_{2.0}$ | A + LiCl | 0.18 | 0.3 | 2.19 × 10$^{-3}$ | 1.56 × 10$^{-3}$ |
| | 19 | 1.4 | 0.8 | 43.8 | 10.4 | 45.8 | Li$_{6.4}$PS$_{4.6}$Cl$_{2.2}$ | A + LiCl | 0.18 | 0.8 | 3.07 × 10$^{-3}$ | 2.13 × 10$^{-3}$ |
| | 20 | 1.6 | 0.8 | 39.6 | 10.4 | 50.0 | Li$_{6.2}$PS$_{4.4}$Cl$_{2.4}$ | A + LiCl | 0.24 | 1.6 | 2.08 × 10$^{-3}$ | 1.25 × 10$^{-3}$ |
| Comparative Examples | 1 | 0.2 | 0.0 | 82.5 | 12.5 | 5.0 | Li$_{6.8}$PS$_{5.8}$Cl$_{0.2}$ | A | 0.00 | 42.5 | 3.90 × 10$^{-4}$ | 3.89 × 10$^{-4}$ |
| | 2 | 0.6 | 0.0 | 72.5 | 12.5 | 15.0 | Li$_{6.4}$PS$_{5.4}$Cl$_{0.6}$ | A | 0.00 | 42 | 8.25 × 10$^{-4}$ | 8.18 × 10$^{-4}$ |
| | 3 | 0.8 | 0.0 | 67.5 | 12.5 | 20.0 | Li$_{6.2}$PS$_{5.2}$Cl$_{0.8}$ | A | 0.00 | 38 | 1.00 × 10$^{-3}$ | 9.50 × 10$^{-4}$ |
| | 4 | 1.0 | 0.0 | 62.5 | 12.5 | 25.0 | Li$_{6.0}$PS$_{5.0}$Cl$_{1.0}$ | A | 0.00 | 35 | 1.30 × 10$^{-3}$ | 1.15 × 10$^{-3}$ |
| | 5 | 1.8 | 0.4 | 38.6 | 11.4 | 50.0 | Li$_{5.6}$PS$_{4.2}$Cl$_{2.2}$ | A + LiCl + unknown | 0.66 | 0.6 | 5.90 × 10$^{-4}$ | 6.42 × 10$^{-5}$ |
| | 6 | 0.2 | 1.0 | 66.0 | 10.0 | 24.0 | Li$_{7.8}$PS$_{5.8}$Cl$_{1.2}$ | A + Li$_2$S | 0.00 | 0.7 | 1.45 × 10$^{-4}$ | 1.17 × 10$^{-4}$ |
| | 7 | 0.8 | 1.0 | 54.0 | 10.0 | 36.0 | Li$_{7.2}$PS$_{5.2}$Cl$_{1.8}$ | A + LiCl | 0.17 | 0.9 | 1.00 × 10$^{-3}$ | 7.00 × 10$^{-4}$ |

From the result in Table 1 and the results of the tests carried out so far, when the compound was a sulfide-based solid electrolyte compound comprising a crystal phase of a cubic argyrodite-type crystal structure and being represented by a composition formula (1): $Li_{7-x+y}PS_{6-x}Cl_{x+y}$, and was a solid electrolyte compound, wherein x and y in the composition formula (1) satisfy $0.05 \leq y \leq 0.9$ and $-3.0x+1.8 \leq y \leq -3.0x+5.7$, it was found that the generation amount of hydrogen sulfide (H$_2$S) could be suppressed to less than 10 cm$^3$·g$^{-1}$ in the above tests, and moreover, the conductivity after exposure to dry air could be enhanced to $1.0 \times 10^{-3}$ S·cm$^{-1}$ or more in the above tests.

<Production and Application Method of Lithium Ion Battery Using the Present Solid Electrolyte Compound>

(Production of Battery)

47.5 parts by mass of pure silicon powder (D50: 2.5 µm, oxygen concentration of 0.7 wt %), 47.5 parts by mass of particle size adjusted article (D50: 3.1 µm) of the sample (the present solid electrolyte powder) obtained in Example 1, and 5 parts by mass of acetylene black (manufactured by Denki Kagaku Kogyo K.K.) as a conductive auxiliary agent were mixed, and the resultant mixture was formed into a disk shape having a thickness of 100 µm to produce a negative electrode pellet.

Further, a particle size adjusted article (D50: 3.1 μm) of the sample (the present solid electrolyte powder) obtained in Example 1 was formed into a disk shape having a thickness of 100 μm to produce a solid electrolyte pellet.

In addition, 60 parts by mass of lithium composite oxide (LiNi$_{0.5}$Co$_{0.2}$Mn$_{0.33}$O$_2$) powder (D50: 2.5 μm), 38 parts by mass of particle size adjusted article (D50: 3.1 μm) of the sample (the present solid electrolyte powder) obtained in Example 1, and 2 parts by mass of acetylene black were mixed, and the resultant mixture was formed into a disk shape having a thickness of 100 μm to produce a positive electrode pellet.

A lower side opening part of a cylinder (opening diameter of 10.5 mm, height of 18 mm) made of polypropylene, in which the upper and lower sides are opened, was closed with a negative electrode, and the negative electrode pellet, the solid electrolyte pellet, and the positive electrode pellet were put on the negative electrode in this order. Then, an upper side opening part of the cylinder was closed with a positive electrode, thereby producing a dice battery.

(Charge and Discharge Conditions)

The following charge and discharge tests (reference test and example test) were performed by using the dice battery produced as described above to evaluate high-temperature cycle characteristics.

In the reference test, a battery was put into an environmental testing chamber whose environmental temperature at which the battery is charged and discharged was set at 25° C. to be able to be charged and discharged, and the battery was left to stand such that the battery temperature became the environmental temperature. Thereafter, at the first cycle, the battery was charged in a 0.1 C constant current/constant potential up to 4.2 V, and then discharged in a 0.1 C constant current down to 2.5 V. At the second cycle, the charge and discharge was performed with a charge and discharge range being set at 4.2 to 2.5 V. Next, the setting condition was changed such that the environmental temperature was set at 60° C., and the battery was left to stand such that the battery temperature became the environmental temperature. Thereafter, at the third or later cycle, with the charge and discharge range being set at 4.2 to 2.5 V, one charge and discharge cycle, in which charge was performed in a 0.1 C constant current/constant potential and discharge was performed in a 0.1 C constant current, was performed, and the charge and discharge cycle was then performed 20 times at 0.2 C.

In contrast, in the example test, a battery was put into an environmental testing chamber whose environmental temperature at which the battery is charged and discharged was set at 25° C. to be able to be charged and discharged, and the battery was left to stand such that the battery temperature became the environmental temperature. Thereafter, at the first cycle, the battery was charged in a 0.1 C constant current/constant potential up to 4.5 V, and then discharged in a 0.1 C constant current down to 2.5 V. At the second cycle, the charge and discharge was performed with a charge and discharge range being set at 4.2 to 2.5 V. Next, the setting condition was changed such that the environmental temperature was set at 60° C., and the battery was left to stand such that the battery temperature became the environmental temperature. Thereafter, at the third or later cycle, with the charge and discharge range being set at 4.2 to 2.5 V, one charge and discharge cycle, in which charge was performed in a 0.1 C constant current/constant potential and discharge was performed in a 0.1 C constant current, was performed, and the charge and discharge cycle was then performed 20 times at 0.2 C.

Meanwhile, in the reference test and the example test, 3 mA was designated as 1 C, and the respective current values of C rate were calculated based on the current value of the 1 C. These current values of C rate were used for the evaluation of a capacity retention rate.

(Results)

As a result, while the capacity retention rate at the 20th cycle was 62.9% in the reference test, the capacity retention rate in the example test was 95%. In addition, a gas generation that was believed to be derived from an electrolytic solution decomposing reaction, which was generally confirmed in a battery containing an electrolytic solution, was not confirmed in the example test.

From the test results as described above and the results of the tests carried out by the present inventors so far, at least regarding the application method of a lithium ion battery comprising the present solid electrolyte and the silicon negative electrode active material, when a termination voltage in the first charging was set to be higher than a termination voltage in the second or later charging in charge and discharge cycles and the battery was then charged and discharged, it was found that, by enhancing activity of the silicon negative electrode active material, the silicon negative electrode active material could be functioned with a high load rate, and thus the charge-discharge cycle ability (cycle characteristic) of the battery could be enhanced. Then, it was also found that since an influence of oxygen associated with the silicon negative electrode active material could be suppressed by the present solid electrolyte, the charge-discharge cycle ability (cycle characteristic) in the charging and discharging under high temperature environment (40° C. or more) as described above could be enhanced.

Furthermore, at this time, it was also found that it was preferable to charge by setting a termination voltage in the first charging to be higher than a termination voltage in the second or later charging.

The invention claimed is:

1. A sulfide-based solid electrolyte compound for a lithium ion battery comprising a crystal phase of a cubic argyrodite-type crystal structure, and
being represented by a composition formula (1): Li$_{7-x+y}$PS$_{6-x}$Cl$_{x+y}$, wherein x and y in the composition formula (1) satisfy 0.05≤y≤0.9 and −3.0x+1.8≤ y≤−3.0x+5.7.

2. The sulfide-based solid electrolyte compound for a lithium ion battery according to claim 1, wherein x and y in the composition formula (1) satisfy 0.05≤y≤0.4 and −3.0x+3.9≤y≤−3.0x+5.7.

3. A solid electrolyte comprising the sulfide-based solid electrolyte compound for a lithium ion battery according to claim 1.

4. The solid electrolyte according to claim 3 comprising a single phase of the crystal phase of the cubic argyrodite-type crystal structure.

5. The solid electrolyte according to claim 3 comprising the crystal phase of the cubic argyrodite-type crystal structure and a crystal phase which is represented by LiCl.

6. The solid electrolyte according to claim 3,
wherein, in an X-ray diffraction pattern, a ratio [I$_L$(200)/I$_A$(220)] of a peak intensity I$_L$(200) of a (200) plane of the LiCl crystal phase with respect to a peak intensity I$_A$(220) of a (220) plane of the cubic argyrodite-type crystal phase is 0.30 or less.

7. A method for producing the sulfide-based solid electrolyte compound for a lithium ion battery having the solid electrolyte according to claim 3, wherein 38.8 to 72.0 parts (mol %) of lithium sulfide (Li$_2$S) powder, 10.2 to 12.4 parts (mol %) of diphosphorus pentasulfide (P$_2$S$_5$) powder, and 15.6 to 51.0 parts (mol %) of lithium chloride (LiCl) powder are mixed, and the resultant mixture is calcined at 350 to 500 C under an inert atmosphere, or at 350 to 550 C under an atmosphere comprising a hydrogen sulfide gas.

8. A lithium ion battery comprising the solid electrolyte according to claim 3.

9. A lithium ion battery comprising the solid electrolyte according to claim 3, and a negative electrode active material containing carbon or silicon.

10. An application method of a lithium ion battery comprising
the solid electrolyte according to claim 3,
a negative electrode active material containing silicon, and
a positive electrode active material containing a lithium composite oxide,
wherein, in charge and discharge cycles, a termination voltage in a first charging is set to be higher than a termination voltage in a second or later charging.

11. A solid electrolyte comprising the sulfide-based solid electrolyte compound for a lithium ion battery according to claim 2.

12. The solid electrolyte according to claim 11 comprising a single phase of the crystal phase of the cubic argyrodite-type crystal structure.

13. The solid electrolyte according to claim 11 comprising the crystal phase of the cubic argyrodite-type crystal structure and a crystal phase which is represented by LiCl.

14. The solid electrolyte according to claim 11,
wherein, in an X-ray diffraction pattern, a ratio [I$_L$(200)/I$_A$(220)] of a peak intensity I$_L$(200) of a (200) plane of the LiCl crystal phase with respect to a peak intensity I$_A$(220) of a (220) plane of the cubic argyrodite-type crystal phase is 0.30 or less.

15. A lithium ion battery comprising the solid electrolyte according to claim 4.

16. A lithium ion battery comprising the solid electrolyte according to claim 5.

17. A lithium ion battery comprising the solid electrolyte according to claim 6.

18. A lithium ion battery comprising the solid electrolyte according to claim 11.

* * * * *

UNITED STATES PATENT AND TRADEMARK OFFICE
CERTIFICATE OF CORRECTION

PATENT NO. : 9,899,702 B2
APPLICATION NO. : 15/538667
DATED : February 20, 2018
INVENTOR(S) : Norihiko Miyashita et al.

It is certified that error appears in the above-identified patent and that said Letters Patent is hereby corrected as shown below:

In the Claims

Column 14, Line 60, Claim 6, delete "[$I_L/(200)/$" and insert -- [$I_L(200)/$ --

Column 15, Line 6, Claim 7, delete "500 C" and insert -- 500° C. --

Column 15, Line 7, Claim 7, delete "550 C" and insert -- 550° C. --

Signed and Sealed this
Twenty-ninth Day of May, 2018

Andrei Iancu
*Director of the United States Patent and Trademark Office*